United States Patent
Fang et al.

(10) Patent No.: US 11,522,334 B2
(45) Date of Patent: Dec. 6, 2022

(54) METHODS AND APPARATUS FOR MEASURING AND LOCKING ULTRA-FAST LASER PULSES

(71) Applicant: INSTITUTE OF PHYSICS, CHINESE ACADEMY OF SCIENCES, Beijing (CN)

(72) Inventors: Shaobo Fang, Beijing (CN); Zhiyi Wei, Beijing (CN); Pei Huang, Beijing (CN); Yitan Gao, Beijing (CN); Kun Zhao, Beijing (CN)

(73) Assignee: INSTITUTE OF PHYSICS, CHINESE ACADEMY OF SCIENCES, Beijing (CN)

( * ) Notice: Subject to any disclaimer, the term of this patent is extended or adjusted under 35 U.S.C. 154(b) by 148 days.

(21) Appl. No.: 16/885,129

(22) Filed: May 27, 2020

(65) Prior Publication Data

US 2021/0376556 A1 Dec. 2, 2021

(51) Int. Cl.
*G01J 11/00* (2006.01)
*G02F 1/35* (2006.01)
(Continued)

(52) U.S. Cl.
CPC .............. *H01S 3/1307* (2013.01); *G01J 9/02* (2013.01); *G01J 11/00* (2013.01); *G02B 26/06* (2013.01);
(Continued)

(58) Field of Classification Search
CPC ......... G01J 11/00; G01J 9/02; G02B 27/1006; G02B 27/141; G02F 1/3528; G02F 1/353
See application file for complete search history.

(56) References Cited

U.S. PATENT DOCUMENTS 5,530,544 A * 6/1996 Trebino .................. G01J 11/00
356/450
5,754,292 A * 5/1998 Kane ....................... G01J 11/00
356/450

FOREIGN PATENT DOCUMENTS

CN 106855437 A * 6/2017
CN 109813451 A * 5/2019
(Continued)

OTHER PUBLICATIONS

Kakehata, Masayuki et al. "Single-shot measurement of carrier-envelope phase changes by spectral interferometry". Optics Letters, vol. 26, No. 18, Sep. 15, 2001, pp. 1436-1438. (Year: 2001).*

(Continued)

*Primary Examiner* — Michael A Lyons
(74) *Attorney, Agent, or Firm* — Zhong Law, LLC

(57) ABSTRACT

Methods and devices are described for performing an all-phase measurement of an ultra-fast laser pulse having a spectral range of greater than one octave. The ultra-fast laser pulse may be split into a first beam comprising a fundamental light with a wavelength $\lambda_0$ and a second beam comprising a light with a wavelength $2\lambda_0$. The light with the wavelength $2\lambda_0$ may be frequency doubled to a light with a wavelength $\lambda_0$ to generate an interference with the fundamental light. Fourier transform may be performed on an interference spectrum of the interference, and a relative envelope delay (RED) between the fundamental light and the frequency doubled light and a carrier envelope phase (CEP) may be acquired based on a result of the Fourier transform.

8 Claims, 3 Drawing Sheets

(51) Int. Cl.
  *G01J 9/02* (2006.01)
  *G02B 27/10* (2006.01)
  *G02B 27/14* (2006.01)
  *H01S 3/13* (2006.01)
  *H01S 3/123* (2006.01)
  *H01S 3/10* (2006.01)
  *H01S 3/00* (2006.01)
  *G02B 26/06* (2006.01)

(52) U.S. Cl.
  CPC ....... *G02B 27/1006* (2013.01); *G02B 27/141* (2013.01); *G02F 1/353* (2013.01); *G02F 1/3528* (2021.01); *H01S 3/0014* (2013.01); *H01S 3/10046* (2013.01); *H01S 3/123* (2013.01)

(56) References Cited

FOREIGN PATENT DOCUMENTS

EP     2101161 A1 *  9/2009   .............. G01J 11/00
EP     3293837 A1 *  3/2018   .............. G01J 11/00

OTHER PUBLICATIONS

Shaobo, Feng et al. "Sub-Optical-Cycle Coherent Waveform Synthesis". Acta Optica Sinica, vol. 39, No. 1, Jan. 2019, pp. 0126006-1-0126006-11. (Year: 2019).*

* cited by examiner

METHODS AND APPARATUS FOR MEASURING AND LOCKING ULTRA-FAST LASER PULSES

TECHNICAL FIELD

The present disclosure relates to the technical field of lasers, and in particular relates to an all-phase measuring and locking method of an ultra-fast laser pulse and a device thereof.

BACKGROUND

In the technical field of lasers, how to obtain laser pulses with stronger energy and shorter pulse width has always been an important research direction. Coherent control and coherent combination can form a combined pulse that is shorter than all incident pulses in pulse width, and also greatly improves the energy of the incident pulses. Therefore, the application of coherent control and coherent combination in the field of ultra-intense and ultra-fast laser pulse generation is a frontier subject of strategic significance in the world at present. The key factor of coherent control and coherent combination is how to achieve all-phase measuring and locking of the ultra-fast laser pulses.

The all-phase of an ultra-fast laser pulse is a relative phase between a plurality of coherently combined laser pulses, which includes a relative envelope delay (RED) between the plurality of coherently combined laser pulses and a carrier envelope phase (CEP) of the laser pulses after they have been coherently combined. The RED is a relative phase difference between two pulse envelopes, while the CEP is a phase difference between the carrier and the envelope peak in a single pulse. In the field of periodic laser pulses, RED and CEP have great influence on the coherent combination of pulses. At present, RED and CEP can be locked and controlled respectively, where the methods of locking and controlling RED include balanced optical cross-correlation (BOC), spectral interference scheme, etc., and the methods of locking and controlling CEP include f-2f scheme, etc. In order to lock and control RED and CEP simultaneously, it is necessary to provide two different devices, resulting in extremely complex measurement processes, difficult operation and poor measurement accuracy.

SUMMARY

Methods and devices are described herein for performing an all-phase measurement of an ultra-fast laser pulse to overcome the defects of the prior art. The ultra-fast laser pulse may have a spectral range of greater than one octave, and the measurement may be performed as follows. The ultra-fast laser pulses may be split into a first beam comprising a fundamental light with a wavelength $\lambda_0$ and a second beam comprising a light with a wavelength $2\lambda_0$. The light with the wavelength $2\lambda_0$ may be frequency doubled to a light with a wavelength $\lambda_0$ to generate an interference with the fundamental light. Fourier transform may be performed on an interference spectrum of the interference, and a relative envelope delay (RED) between the fundamental light and the frequency doubled light may be acquired, together with a carrier envelope phase (CEP), for example, based on a result of the Fourier transform.

The spectral range of the ultra-fast laser pulse may be between 450 nm and 1000 nm. The wavelength $\lambda_0$ may be 480 nm. An abscissa and an ordinate of a first peak of the result of the Fourier transform described above may represent the RED and a total relative phase (RTP) respectively. The CEP may be calculated by the following formula:

$$\Phi = w\Delta t + \pi/2 + \varphi_{CE},$$

where $\Phi$ may be the total relative phase (RTP), w may be the frequency of the ultra-fast laser pulse, $\Delta t$ may be the relative envelope delay (RED), and $\varphi_{CE}$ may be the carrier envelope phase (CEP).

The all-phase measurement described herein may further include applying feedback locking based on the RED and the CEP.

A device configured to perform the all-phase measurement of the ultra-fast laser pulse as described herein may include an ultra-fast laser source for emitting the ultra-fast laser pulse. The device may further include a beam splitting element for splitting the ultra-fast laser pulse into the first beam comprising the fundamental light and the second beam comprising the light with a wavelength $2\lambda_0$. The device may also include at least one optical path adjusting member, a beam combining element, a frequency doubling crystal, a polarization adjusting member, a spectral acquisition device, and a data processing unit. The at least one optical path adjusting member may be configured to adjust an optical path of the first beam or the second beam. The beam combining element may be disposed behind the at least one optical path adjusting member for combining the first beam and the second beam. The frequency doubling crystal may be configured to frequency double the light with the wavelength $2\lambda_0$ to the light with the wavelength $\lambda_0$. The polarization adjusting member may be configured to adjust polarization directions of the fundamental light and the frequency doubled light to cause an interference therebetween. The spectral acquisition device may be configured to acquire a spectral pattern of the interference, and the data processing unit may be configured to perform the Fourier transform on the spectral pattern of the interference, and extract the RED between the fundamental light and the frequency doubled light and the CEP.

The device may further comprise a feedback control unit for feeding the RED back to the at least one optical path adjusting member and feeding the CEP back to the ultra-fast laser source. As described herein, an abscissa and an ordinate of a first peak of the result of the Fourier transform may represent the RED and a total relative phase (RTP) respectively, and the data processing unit may be configured to calculate the CEP by the following formula:

$$\Phi = w\Delta t + \pi/2 + \varphi_{CE},$$

where $\Phi$ may be the total relative phase (RTP), w may be the frequency of the ultra-fast laser pulse, $\Delta t$ may be the relative envelope delay (RED), and $\varphi_{CE}$ may be the carrier envelope phase (CEP).

BRIEF DESCRIPTION OF THE DRAWINGS

Embodiments are further described below with reference to the accompanying drawings, in which.

DETAILED DESCRIPTION

In order to make the objective, technical solutions and advantages of the embodiments described herein more clear, the embodiments will be described in further detail below with reference to the accompanying drawings by the embodiments. It should be understood that the specific embodiments described herein are only provided as examples and not meant to limit the scope of the methods and apparatus disclosed herein.

Figure 1:
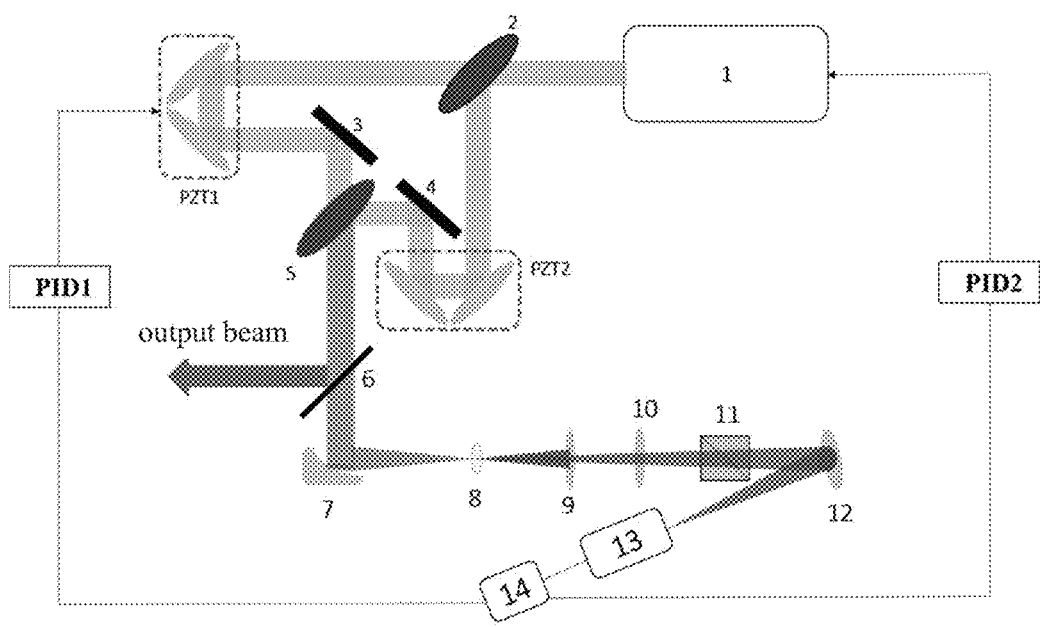
FIG. 1 is an optical path diagram for all-phase measuring and locking of an ultra-fast laser pulse according to an embodiment.
Figure 2:
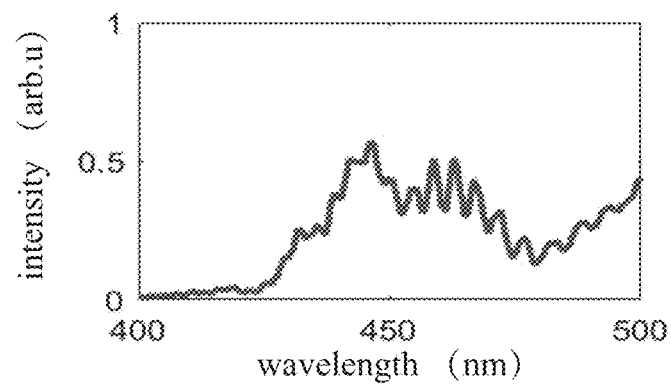
FIG. 2 is a diagram illustrating an interference spectrum curve according to an embodiment.

In an embodiment, an all-phase measuring and locking method is provided for an ultra-fast laser pulse. FIG. 1 is an optical path diagram illustrating all-phase measuring and locking of the ultra-fast laser pulse. An ultra-fast laser source 1, comprising a Tisapphire laser and a spectrum broadening member, outputs a super-continuum light with an energy of 0.4 mJ and a wave band of 450-1000 nm, which is incident on a dichroic mirror 2. The dichroic mirror 2 splits the super-continuum light into a long wavelength beam of 650-1000 nm and a short wavelength beam of 450-750 nm. The long wavelength beam passes through a piezoelectric ceramic translation stage PZT1 and a reflector 3 and reaches a dichroic mirror 5, while the short wavelength beam passes through a piezoelectric ceramic translation stage PZT2 and a reflector 4 and reaches the dichroic mirror 5. The PZT1 and PZT2 are configured to adjust optical paths of the two beams which are combined by the dichroic mirror 5 and then reach a wedge-pair beam splitter 6. Most of the combined beams are output from the wedge-pair beam splitter 6 as an output beam, and a small part of the combined beams serve as a measuring and locking beam to realize the subsequent measuring and locking process. Specifically, the locking beam is focused on a type-I phase-matched BBO crystal 8 via a parabolic mirror 7, wherein the beam with a wavelength of about 960 nm in the long wavelength beam are frequency-doubled to about 480 nm by the BBO crystal 8, and the polarization state thereof rotates by 90 degrees compared with that of the fundamental light. Then, the fundamental light beam and the frequency doubled light beam of about 480 nm are output from a band-pass filter 9, and the beams of other wavelengths are filtered out by the band-pass filter 9. The beams of about 480 nm emitted from the band-pass filter 9 enter into a half-wave plate 10 and a Glan polarizer 11 which jointly adjust the polarization state of the incident beams so that the fundamental light beam and the frequency doubled light beam have polarized components in the same direction so as to generate an interference with each other. Then, the interfered beams are focused on a spectrometer 13 with an accuracy of 0.5 nm by a broad-band concave silver mirror 12 with a radius of curvature of 100 nm to collect an interference spectrum, a curve of which is shown in FIG. 2.

In the frequency domain, the short-wavelength fundamental light and the long-wavelength frequency-doubled light in the super-continuum spectrum can be expressed as:

$$E_f(w) = \sqrt{I_f(w)} e^{i[\varphi_f(w) + \varphi_{CE}]} \quad (1)$$

$$E_{sh}(w) = \sqrt{I_{sh}(w)} e^{i[\varphi_f(w) + \pi/2 + 2\varphi_{CE} + w\Delta t]} \quad (2)$$

where $I_f(w)$ and $I_{sh}(w)$ are respectively the intensity of the short-wavelength beam of the fundamental light and the intensity of the beam by frequency doubling the long-wavelength beam of the fundamental light, w is the frequency of the laser pulse, $\varphi_{CE}$ is the carrier envelope phase (CEP) of the laser pulse, and $\Delta t$ is the relative envelope delay (RED) between the two laser pulses. According to Maxwell's equation, there is a fixed phase shift of $\pi/2$ between a second harmonic electric field and the fundamental frequency of the long-wavelength beam. Therefore, $\varphi_f(w)$ and $\varphi_f(w) + \pi/2$ are the spectral phases of the fundamental light and the frequency doubled light, respectively.

The intensity of the interference beam may be expressed as:

$$I(w) \propto |E_f(w) + E_{sh}(w)|^2 = I_f(w) + I_{sh}(w) + 2\sqrt{I_f(w)I_{sh}(w)} \cos(w\Delta t + \pi/2 + \varphi_{CE}) \quad (3)$$

wherein the third item in the formula represents an interference item that involves the information of CEP and RED.

The spectrometer 13 is connected to a data processing unit 14 configured to perform Fourier transform on the intensity of the interference beam of formula (3) above. An imaginary part of the transformation result may represent the total relative phase (RTP):

$$\Phi = w\Delta t + \pi/2 + \varphi_{CE} \quad (4)$$

Figure 3:
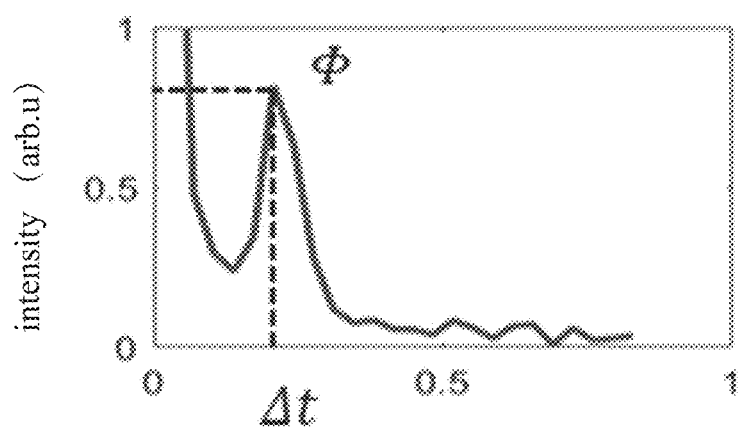
FIG. 3 is a diagram illustrating a Fourier transform pattern of the interference spectrum curve shown in FIG. 2.

As can be seen from the above formula, the RTP between the two beams includes the relative envelope delay $\Delta t$ and the carrier envelope phase $\varphi_{CE}$. Fourier transform is performed on an interference pattern collected by the spectrometer to obtain a curve shown in FIG. 3, which is a Fourier transform pattern of the interference spectrum curve shown in FIG. 2. In FIG. 3, the horizontal axis represents time, the vertical axis represents intensity, and the abscissa and ordinate of the first peak (first order) in the curve are RED (i.e., $\Delta t$) and RTP (i.e., $\Phi$) respectively. By substituting the values of $\Delta t$ and $\Phi$ into the above formula (4), the $\varphi_{CE}$, i.e., CEP, can be obtained, thus obtaining the RED and CEP, i.e., the master phase information of the ultra-fast laser. Referring to FIG. 1 again, in order to realize the locking and controlling, a first feedback module PID1 feeds the RED back to the PZT1 to lock the RED, and a second feedback module PID2 feeds the CEP back to a compressor of the ultra-fast laser source 1 to lock the CEP, thereby finally achieving all-phase locking of the super-continuum laser.

Figure 4A:
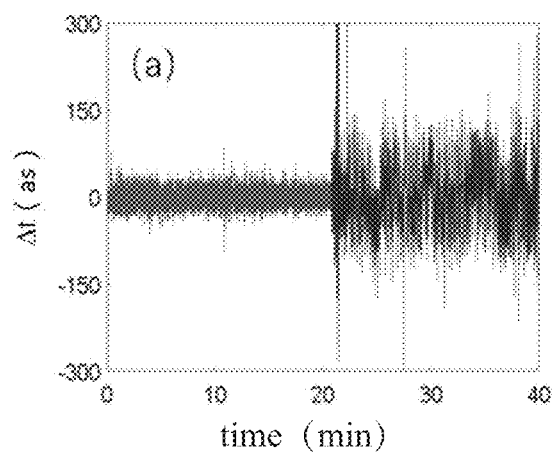
FIGS. 4A-4C are diagrams that respectively illustrate RED data, RTP data and interference spectrum patterns of the ultra-fast laser pulse with its all phase locked and unlocked.
Figure 4B:
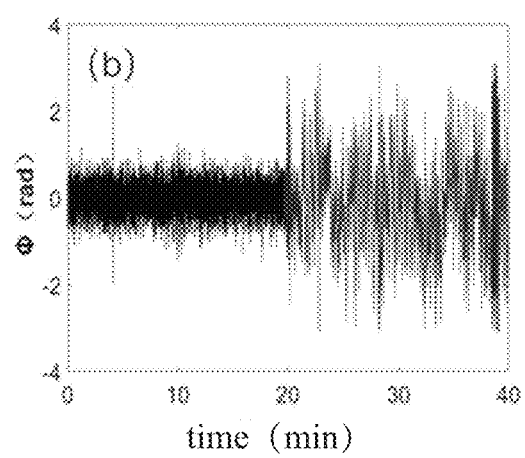
Figure 4C:
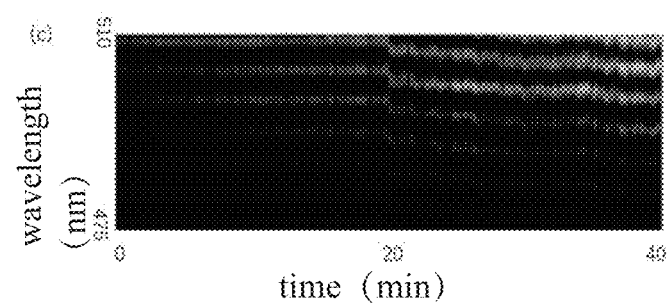

FIGS. 4A-4C show example monitoring results of RED data, RTP data and interference spectrum patterns of a laser pulse with its all phase locked during 0-20 min and unlocked during 20-40 min. Referring to FIG. 4A, the RED has a root mean square (RMS) value of about 25 during 0-20 min and about 130 during 20-40 min. Referring to FIG. 4B, the RTP has an RMS value of about 300 mrad during 0-20 min and about 1000 rmad during 20-40 min. Referring to FIG. 4C, the interference spectrum is relatively clean during 0-20 min and relatively disordered during 20-40 min. It can be seen from the figures that all-phase locking greatly improves the performance of the super-continuum laser source.

In an embodiment, an f-2f device comprising the BBO crystal 8, the band-pass filter 9, the half-wave plate 10, the Glan polarizer 11, the broad-band concave silver mirror 12 and the spectrometer 13 is configured to obtain an interference spectrum information of the two beams. The relative envelope delay of the two beams and carrier envelope phase are extracted from the interference spectrum information, and then fed back to the piezoelectric ceramic and the ultra-fast laser source, respectively, so as to achieve all-phase locking of the ultra-fast laser. The RED can be locked by feeding the RED back to the PZT2 through the first feedback module PID1, and the CEP can be fed back to other members in the laser source, such as amplifiers, stretchers and so on.

A fiber laser may be adopted to obtain the ultra-fast laser by broadening the output of the fiber laser. The piezoelectric ceramic described herein may be replaced with other optical path adjusting members. Furthermore, only one optical path adjusting member may be provided for adjusting the optical path of the long-wavelength beam or the short-wavelength beam, and adjusting the optical path difference between the two beams. The dichroic mirror 2 and dichroic mirror 5 may be replaced with other beam splitting/combining elements.

The data processing unit, the first feedback module and/or the second feedback module may be integrated in a computer to realize Fourier transform of the spectrum as well as extraction and feedback locking of the relative envelope delay and carrier envelope phase. The frequency doubling crystal may employ other third-order nonlinear media, such as KDP, PPLN, ammonium dihydrogen phosphate (ADP), potassium dihydrogen phosphate (KDP), potassium dideuterium phosphate (DKDP), cesium dideuterium sulfate (DCDA) and cesium dihydrogen sulfate (CDA), and so on.

The spectral range of the super-continuum spectrum output by the ultra-fast laser source may be greater than one octave. To achieve all-phase locking, the ultra-fast laser is split into a first beam containing a light with a wavelength $\lambda_0$ and a second beam containing a light with a wavelength $2\lambda_0$, so that the light beam with the wavelength $2\lambda_0$ is frequency-doubled to interfere with the fundamental light beam with the wavelength $\lambda_0$. The corresponding RED and CEP can be extracted by collecting the interference spectrum and further performing Fourier transform, thus further achieving all-phase locking of the ultra-fast laser pulse. The methods and devices described herein are also suitable for all-phase measurement of electromagnetic spectrum in other frequency bands, such as X-ray, UV-light, visible light, infrared light or Terahertz wave bands.

Although examples and embodiments are described herein, the methods and apparatus for measuring and locking ultra-fast laser pulses are not limited to the described examples and embodiments, and can include variations made without departing from the scope of the disclosure.

The invention claimed is:

1. A method for performing an all-phase measurement of an ultra-fast laser pulse, a spectral range of the ultra-fast laser pulse being greater than one octave, and the method comprising:
   splitting the ultra-fast laser pulse into a first beam comprising a fundamental light with a wavelength $\lambda_0$ and a second beam comprising a light with a wavelength $2\lambda_0$;
   combining the first beam and the second beam;
   frequency doubling the light with the wavelength $2\lambda_0$ to a light with a wavelength $\lambda_0$ to generate an interference with the fundamental light;
   acquiring an interference spectrum of the interface;
   performing Fourier transform on the interference spectrum of the interference; and
   acquiring a relative envelope delay (RED) between the fundamental light and the frequency doubled light and a carrier envelope phase (CEP) based on a result of the Fourier transform;
   wherein an abscissa and an ordinate of a first peak of the result of the Fourier transform represent the RED and a total relative phase (RTP), respectively.

2. The method according to claim 1, wherein the spectral range of the ultra-fast laser pulse is between 450 nm and 1000 nm.

3. The method according to claim 2, wherein the wavelength $\lambda_0$ is 480 nm.

4. The method according to claim 1, wherein the CEP is calculated by the following formula:

$$\Phi = w\Delta t + \pi/2 + \varphi_{CE},$$

where $\Phi$ is the total relative phase (RTP), ww is the frequency of the ultra-fast laser pulse, $\Delta t$ is the relative envelope delay (RED), and $\varphi_{CE}$ is the carrier envelope phase (CEP).

5. The method according to claim 1, further comprising applying feedback locking based on the RED and the CEP.

6. An all-phase measurement device associated with an ultra-fast laser pulse, comprising:
   an ultra-fast laser source for emitting an ultra-fast laser pulse having a spectral range greater than one octave;
   a beam splitting element for splitting the ultra-fast laser pulse into a first beam that comprises a fundamental light with a wavelength $\lambda_0$ and a second beam that comprises a light with a wavelength $2\lambda_0$;
   at least one optical path adjusting member for adjusting an optical path of the first beam or the second beam;
   a beam combining element disposed behind the at least one optical path adjusting member for combining the first beam and the second beam;
   a frequency doubling crystal for frequency doubling the light with the wavelength $2\lambda_0$ to a light with a wavelength $\lambda_0$;
   a polarization adjusting member for adjusting polarization directions of the fundamental light and the frequency doubled light to cause an interference therebetween;
   a spectral acquisition device for acquiring a spectral pattern of the interference; and
   a data processing unit for performing Fourier transform on the spectral pattern of the interference, and extracting a relative envelope delay (RED) between the fundamental light and the frequency doubled light and a carrier envelope phase (CEP);
   wherein an abscissa and an ordinate of a first peak of the result of the Fourier transform represent the RED and a total relative phase (RTP), respectively.

7. The all-phase measurement device according to claim 6, further comprising a feedback control unit for feeding the RED back to the at least one optical path adjusting member and feeding the CEP back to the ultra-fast laser source.

8. The all-phase measurement device according to claim 6, wherein the data processing unit is configured to calculate the CEP by the following formula:

$$\Phi = w\Delta t + \pi/2 + \varphi_{CE},$$

where $\Phi$ is the total relative phase (RTP), w is the frequency of the ultra-fast laser pulse, $\Delta t$ is the relative envelope delay (RED), and $\varphi_{CE}$ is the carrier envelope phase (CEP).

* * * * *